(12) United States Patent
Aoki

(10) Patent No.: US 8,908,096 B2
(45) Date of Patent: Dec. 9, 2014

(54) IMAGE OUTPUT METHOD AND DEVICE, AND IMAGE DISPLAY FOR DISPLAYS WITH DIFFERENT ASPECT RATIOS

(71) Applicant: Sony Computer Entertainment Inc., Tokyo (JP)

(72) Inventor: Sachiyo Aoki, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 14/198,933

(22) Filed: Mar. 6, 2014

(65) Prior Publication Data

US 2014/0184473 A1    Jul. 3, 2014

Related U.S. Application Data

(63) Continuation of application No. 13/189,786, filed on Jul. 25, 2011, now Pat. No. 8,711,286, which is a continuation of application No. 11/664,477, filed as application No. PCT/JP2005/010380 on Jun. 6, 2005, now Pat. No. 8,085,348.

(30) Foreign Application Priority Data

Oct. 5, 2004    (JP) ................. 2004-293123

(51) Int. Cl.
| | |
|---|---|
| *H04N 5/46* | (2006.01) |
| *H04N 5/445* | (2011.01) |
| *G06F 3/14* | (2006.01) |
| *G09G 5/00* | (2006.01) |
| *H04N 7/01* | (2006.01) |

(52) U.S. Cl.
CPC ............ *G06F 3/1423* (2013.01); *H04N 7/0122* (2013.01); *H04N 5/46* (2013.01); *G06F 3/1415* (2013.01); *G09G 5/005* (2013.01); *H04N 5/44591* (2013.01); *G09G 2320/08* (2013.01); *G09G 2340/0442* (2013.01)
USPC ........................... 348/556; 348/558; 348/564

(58) Field of Classification Search
USPC ......... 348/445, 556, 565, 588, 567, 568, 558, 348/714, 716, 718, 598, 600; 345/660, 634, 345/635, 682
See application file for complete search history.

(56) References Cited

U.S. PATENT DOCUMENTS 4,885,634 A * 12/1989 Yabe ................................ 348/71
5,034,888 A * 7/1991 Uehara et al. ................. 600/101

(Continued)

FOREIGN PATENT DOCUMENTS

| | | |
|---|---|---|
| EP | 1 011 124 | 6/2000 |
| EP | 1 217 600 | 6/2002 |

(Continued)

OTHER PUBLICATIONS

Supplementary European Search Report dated Jun. 2, 2009, from the corresponding European Application No. 05751596.7-2005.

(Continued)

*Primary Examiner* — Victor Kostak
(74) *Attorney, Agent, or Firm* — Katten Muchin Rosenman LLP

(57) ABSTRACT

First and second division patterns are defined so that main areas A and A' are similar to each other in shape, having the same horizontal-to-vertical ratio. Even if an image output apparatus is connected to a display unit having both first and second display screens, the image output apparatus generates an identical image for the main area A or A' regardless of the aspect ratio of the display screen. The main areas A and A' display important information and the like. Sub areas B and B' display auxiliary information. The first and second division patterns may be determined so that the sub areas B and B' are similar to each other in shape like the main areas.

10 Claims, 7 Drawing Sheets

(56) References Cited

U.S. PATENT DOCUMENTS

| | | | |
|---|---|---|---|
| 5,146,335 A * | 9/1992 | Kim et al. | 348/564 |
| 5,170,256 A | 12/1992 | Tabata | |
| 5,193,006 A | 3/1993 | Yamazaki | |
| 5,365,276 A | 11/1994 | Imai et al. | |
| 5,504,535 A | 4/1996 | Abe | |
| 5,576,769 A | 11/1996 | Lendaro | |
| 5,587,744 A | 12/1996 | Tanaka | |
| 5,734,436 A * | 3/1998 | Abe et al. | 348/564 |
| 6,292,226 B1 * | 9/2001 | Yamanaka et al. | 348/556 |
| 6,310,655 B1 | 10/2001 | Godwin | |
| 6,388,702 B1 * | 5/2002 | Konomura et al. | 348/74 |
| 6,822,699 B2 * | 11/2004 | Furui | 348/778 |
| 6,927,801 B2 * | 8/2005 | Yugami et al. | 348/458 |
| 7,046,302 B2 | 5/2006 | Konuma | |
| 7,224,401 B2 | 5/2007 | Ackley et al. | |
| 7,245,316 B2 | 7/2007 | Grimes et al. | |
| 2001/0052902 A1 | 12/2001 | Ono et al. | |
| 2004/0263686 A1 | 12/2004 | Kim | |

FOREIGN PATENT DOCUMENTS

| | | |
|---|---|---|
| EP | 1 274 232 | 1/2003 |
| GB | 2 262 407 | 6/1993 |
| JP | 11-143440 | 5/1999 |
| JP | 2000-206947 | 7/2000 |
| JP | 2001-265301 | 9/2001 |
| JP | 2002-221955 | 8/2002 |
| WO | 01/61679 | 8/2001 |

OTHER PUBLICATIONS

Notification of Reason(s)for Refusal dated Jun. 28, 2005, from the corresponding Japanese Application 2004-293123.

European Communication Pursuant to Article 94(3) EPC dated Sep. 15, 2011 from corresponding European Application No. 05 751 596.7-2205.

U.S. Office Action dated Apr. 19, 2011 for U.S. Appl. No. 11/664,477.

International Search Report, International Preliminary Report on Patentability and Written Opinion of the International Searching Authority dated Jul. 12, 2005 for corresponding International Application No. PCT/JP2005/010380.

U.S. Office Action dated Sep. 5, 2013 for U.S. Appl. No. 13/189,786.

U.S. Office Action dated May 15, 2013 for U.S. Appl. No. 13/189,786.

* cited by examiner

IMAGE OUTPUT METHOD AND DEVICE, AND IMAGE DISPLAY FOR DISPLAYS WITH DIFFERENT ASPECT RATIOS

TECHNICAL FIELD

The present invention relates to an image output method.

BACKGROUND ART

Image output apparatuses which generate and output video pictures and images, including game consoles and digital versatile disc players (DVD players), are used as they are with various types of display units such as plasma display televisions, liquid crystal display televisions, CRT televisions, or liquid crystal display monitors.

These display units do not necessarily have display screens with a standardized aspect ratio. Display screens with aspect ratios of 4:3 and 16:9 are commonly in use at present.

When displaying video contents such as a movie or a game on these display screens with different aspect ratios, DVD players and game consoles display images corresponding to the aspect ratios of the respective display units by using a letterbox method, a pan-and-scan method, or a squeeze method. These methods have sometimes caused problems as display screens being only partly used, images that are supposed to be displayed being in part not displayed, or images being distorted.

To solve these problems, it might be possible to generate and output different pictures or images depending on the aspect ratios of the respective display screens. For example, when a game console outputs three-dimensional graphic images, the three-dimensional models may be created in a world coordinate system that is provided for a volume greater than possible view volumes, so that images and video pictures to be displayed are generated by modifying a clipping area according to the aspect ratio of the display screen.

In this case, it is possible to output distortion-free images on the entire display screen simply by modifying the view clip and without changing the three-dimensional modeling processing. Nevertheless, in the case of a car racing game, for example, there may arise the problem that adjacent cars appear on a display screen with one aspect ratio while they disappear from a display screen with a different aspect ratio. Moreover, in games where players can change character positions and views freely, objects that must not be displayed on display screens or that should be hidden from the game players may inadvertently appear in some cases.

Unlike movies and other such contents, games have the property that scenes to be displayed on display screens vary minute by minute with player instructions. When programming games, it is therefore unrealistic, in view of the necessary effort to predict every player instruction and perform tests and debugs with display screens with different aspect ratios.

DISCLOSURE OF THE INVENTION

Problems to be Solved by the Invention

The present invention has been achieved in view of the foregoing problems, and a general purpose thereof is to provide a method for outputting images or video pictures to display screens with different aspect ratios efficiently and without causing the contents to fail.

Means to Solve the Problems

An image output method according to one embodiment of the present invention includes: defining division patterns in advance for dividing a display screen into a plurality of areas in association with an aspect ratio of the display screen; and dividing a target display screen into a plurality of areas in accordance with the division pattern corresponding to the aspect ratio thereof. It also includes generating images for each of the plurality of areas divided, and outputting the images to the plurality of areas, respectively.

Advantages of the Invention

The image output method according to the present invention makes it possible to output images or video pictures to display screens with different aspect ratios efficiently and without causing the contents to fail.

BRIEF DESCRIPTION OF THE DRAWINGS

FIGS. 5A and 5B are diagrams showing examples of images to be displayed in the sub areas;

Figure 1:
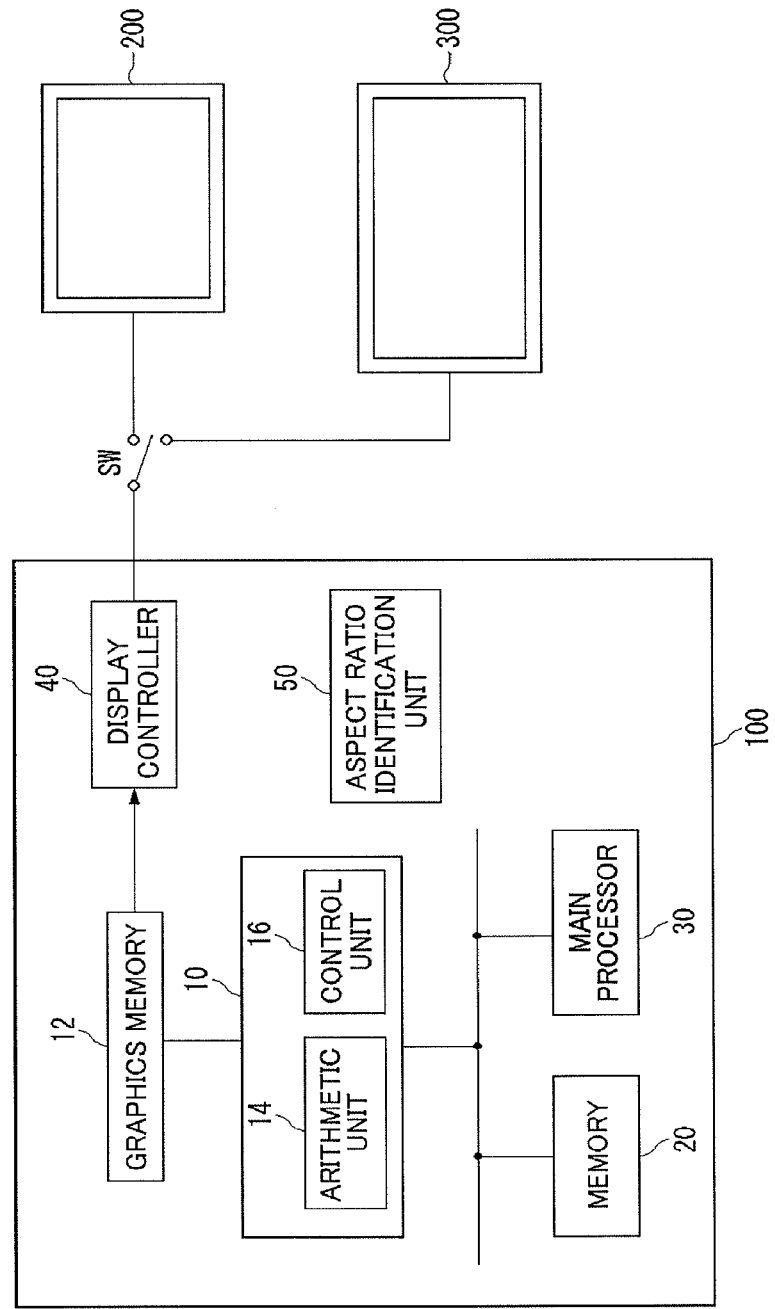
FIG. 1 is a block diagram showing the configuration of an image output apparatus according to a first embodiment of the present invention.

DESCRIPTION OF REFERENCE NUMERALS 10 graphics processor, 12 graphics memory, 14 arithmetic unit, 16 control unit, 20 memory, 30 main processor, 40 display controller, 50 aspect ratio identification unit, 100 image output apparatus, 200 display unit, 500 image display apparatus, 510 input unit, 520 arithmetic processing unit, 530 video memory, 540 display screen, 550 antenna

BEST MODE FOR CARRYING OUT THE INVENTION

Before describing embodiments in detail, an overview thereof will be given.

One embodiment relates to an image output method. In this image output method, division patterns are defined in advance for dividing a display screen into a plurality of areas in association with an aspect ratio of the display screen, and a target display screen is divided into a plurality of areas in accordance with the division pattern corresponding to the aspect ratio thereof. Images are generated for each of the plurality of areas divided, and the generated images are output to the plurality of areas, respectively.

Since the division pattern of the display screen is previously determined in association with the aspect ratio of the display screen, it is possible to use the entire display screen efficiently. It should be noted that, as employed herein, video pictures and images to be displayed on display screens will be referred to simply as "images" irrespective of whether they are moving images or still images, and regardless of the contents thereof.

An image output method according to one embodiment includes: dividing a display screen so that a main area out of a plurality of areas obtained by dividing the display screen has a predetermined horizontal-to-vertical ratio irrespective of the aspect ratio of the display screen. An image having the predetermined horizontal-to-vertical ratio is generated and output to the main area irrespective of the aspect ratio of the display screen.

The term "main area" refers to an area that lies at the center, an area that is the largest, an area that is more noticeable than the others, or the like. Otherwise, it refers to an area where information is displayed which is more important, or which users should pay more attention to, than that in the other areas.

In particular, we will assume two display screens having different aspect ratios as shown in FIG. 2 to be discussed in more detail later. When outputting to a first display screen, the first display screen is divided into a main area and a sub area based on a first division pattern, and images for each of the areas are generated and output to the first display screen. Moreover, when outputting to a second display screen, the second display screen is divided into a main area and a sub area based on a second division pattern, and images for each of the areas are generated and output to the second display screen. The first and second division patterns may be defined so that the main area obtained by dividing the first display screen and the main area obtained by dividing the second display screen are similar to each other in shape.

If the main areas obtained by dividing display screens with different aspect ratios are similar in shape and identical images are displayed in the respective main areas, it is possible to create images to be displayed in the main areas regardless of the aspect ratios of the display screens, and display them in the main areas without distortion or accidental clipping.

The term "identical images" refers to images that are considered to be visually equivalent, including images that are scaled up/down, images that are different in resolution alone, and images that are in different color scales.

The first and second division patterns may also be defined so that the sub area obtained by dividing the first display screen and the sub area obtained by dividing the second display screen are analogous to each other in shape. In this case, information having low directionality, such as figures that are comprehensible even when rotated by 90°, can be displayed in the sub areas as identical images.

The main areas and the sub areas may be updated at different frequencies. When the main areas and the sub areas display different information, updating the pieces of information at respectively appropriate frequencies can reduce the amount of arithmetic processing or the like required for image generation.

When the first display screen and the second display screen have aspect ratios of 16:9 and 16:12, respectively, the first division pattern may be defined so as to divide the first display screen in approximately 1.26:14.74 horizontally while the second division pattern is defined so as to divide the second display screen in approximately 9.77:2.23 vertically. These division patterns can make the main areas and the sub areas similar to each other between a widescreen television and a standard television.

Images rotated by 90° may be output to the sub areas obtained by dividing the first and second display screens, respectively, in accordance with their respective horizontal-to-vertical ratios.

Images having the same meaning may be output to the sub area obtained by dividing the first display screen and the sub area obtained by dividing the second display screen, respectively.

The term "having the same meaning" refers to pieces of information which are not considered to be identical in terms of images but which correspond to each other in meaning, such as when an identical sentence is written in Japanese vertical writing and horizontal writing, and when indicators for displaying identical information are arranged in different orientations, i.e., vertically and horizontally. For example, indicators for indicating a time concept may be displayed in the sub areas in modes of expression appropriate to the shapes of the respective areas, such that a graphic representation like FIG. 3A to be discussed in more detail later is displayed in a horizontally long area while hourglass graphics are displayed in a vertically long area.

Image information may be output to the main area obtained by dividing the first or second display area while text information is output to the sub area obtained by dividing the first or second display screen.

The sub area obtained by dividing the first display screen and the sub area obtained by dividing the second display screen may be further divided into the same numbers of small areas, respectively. Moreover, the respective small areas of the first and second display screens may be associated with each other, and images having the same meaning may be output to the associated small areas of the first and second display screens.

At least one pair of associated small areas of the first and second display screens may be similar to each other in shape, having the same horizontal-to-vertical ratio. In this case, identical images may be output to the respective small areas.

Yet another embodiment is an image output apparatus. This apparatus includes: an aspect ratio identification unit which identifies the aspect ratio of a display screen of a display unit for an image to be output to; an image generating unit which generates an image to be output to the display screen; and an output unit which outputs the image generated by the image generating unit to the display screen. The image generating unit may generate images to be output to respective areas obtained by dividing the display screen based on a division pattern defined in association with the aspect ratio identified by the aspect ratio identification unit.

Yet another embodiment is an image display apparatus. This apparatus includes: an input unit for image data to be input to on the precondition that a display screen is divided into a plurality of areas and images are to be displayed in the respective areas, the image data corresponding to each of the areas; a memory which stores images to be output to the display screen; and an arithmetic processing unit which divides the memory into a plurality of areas according to a division pattern of the display screen, and arranges the image data input from the input unit in the respective areas.

The image display apparatus accepts the data relating to each area from a game console, a DVD player, or the like. The image display apparatus can arrange the data in a memory such as a frame buffer, thereby dividing the image to be output to the display screen appropriately.

It should be appreciated that any combinations of the foregoing components, and the components and expressions mutually substituted between methods, apparatuses, systems, and the like are also intended to constitute applicable embodiments Hereinafter, embodiments of the invention will be described in detail in conjunction with first and second embodiments.

(First Embodiment)

A first embodiment of the present invention will deal with an image output method, taking a game console as an example of the image output apparatus. FIG. 1 is a block diagram showing the configuration of an image output apparatus 100 according to the first embodiment. The image output apparatus 100 according to the present embodiment divides the display screen of a display unit connected thereto in accordance with the aspect ratio of the display screen, and displays images in respective corresponding areas.

The image output apparatus 100 is connected with display units 200 and 300 that have display screens with different aspect ratios. The switch SW shown in FIG. 1 does not represent mechanical or electric switching between the display units 200 and 300, but implies that display units having display screens of different aspect ratios can be connected.

Figure 2A:
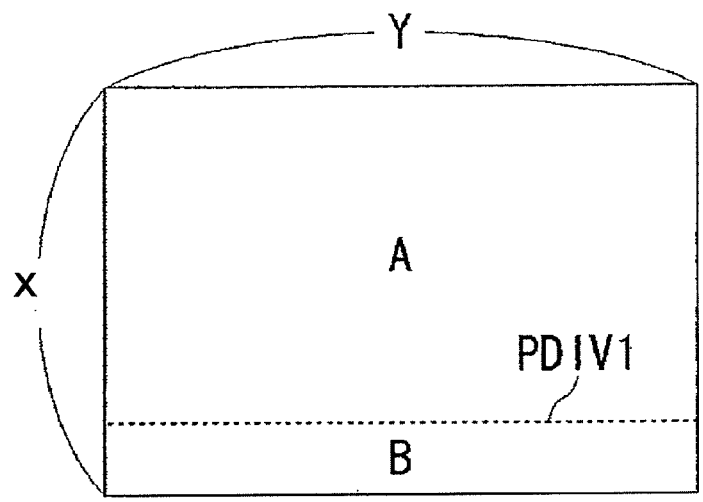
FIGS. 2A and 2B are diagrams showing examples of division patterns that are defined in association with the aspect ratios of a first display screen and a second display screen, respectively.
Figure 2B:
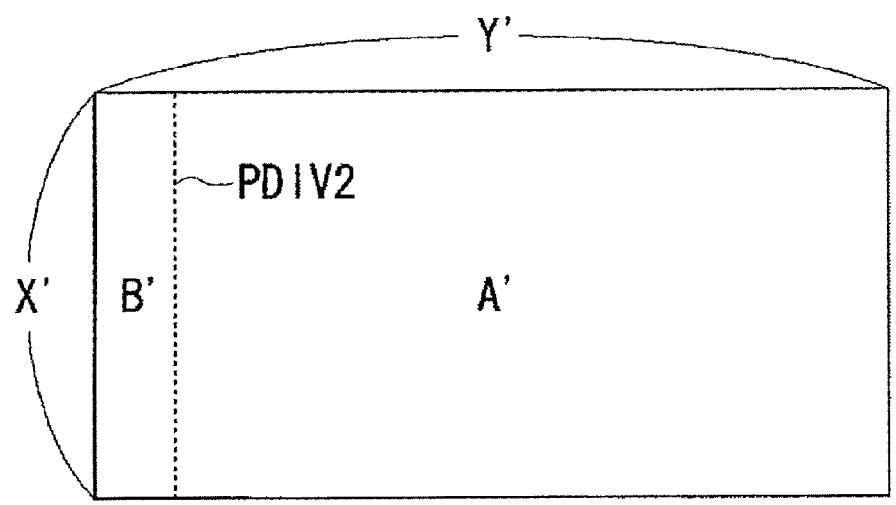

Initially, description will be given of division patterns of the display screens, which are one of the features of the present invention. The display screens of the display units 200 and 300 will be referred to as a first display screen and a second display screen, respectively. FIGS. 2A and 2B show, in broken lines, examples of the division patterns that are defined in association with the aspect ratios of the first display screen and the second display screen, respectively. The first display screen of FIG. 2A has an aspect ratio of X:Y, and is divided into a main area A and a sub area B according to a first division pattern PDIV1. Moreover, the second display screen in FIG. 2B has an aspect ratio of X':Y', and is divided into a main area A' and a sub area B' according to a second division pattern PDIV2. Here, the first and second division patterns PDIV1 and PDIV2 are determined so that the main areas A and A' are similar to each other in shape, having the same horizontal-to-vertical ratio.

The main areas A and A' are used to display more important information than the sub areas B and B', information which game players should pay the most attention to, or the like. Take, for example, the case of displaying a car-racing game screen on each display screen. The main areas A and A' both display scenery where a racing circuit is viewed from the viewpoint of a driver through a windshield. That is, the main areas A and A' display the circuit road, background, and other cars. The sub areas B and B' display the scenery reflected on a rearview mirror and instruments such as a speedometer.

In the present embodiment, the division patterns are determined so that the main areas A and A' are similar to each other in shape. Whichever display screen, first or second, the display unit in connection has, the image output apparatus 100 therefore has only to generate an identical image for the main area A or A' regardless of the aspect ratio of the display screen. As a result, it is possible to avoid inconsistency between the display screens of different aspect ratios and the failure of the game contents.

Furthermore, even when programming a game or the like in which the screen to appear on the display screen varies minute by minute with player instructions, it is possible to reduce the effort involved in performing tests and debugs on display screens with respective different aspect ratios at least as far as images to be displayed in the main area are concerned. This allows an improvement in the development efficiency.

Next, description will be given of the sub areas B and B'. These sub areas B and B' can be utilized in various ways, but the sub areas B and B' will chiefly display information that is somewhat auxiliary to the information displayed in the main areas A and A'. Suitable image modes for displaying auxiliary information include text information, icons, indicators, and logos.

As auxiliary information to be displayed as text information, icons, indicators, and the like, it is possible to display parameters indicating the amount of money and the growth level a player-operated character has, or conversations between characters.

Moreover, in a game where the image output apparatus 100, or game console, is connected to a network and communicates with other game consoles to play, the sub area may display the contents of chats between the players etc.

If the sub area is used independently of the application that uses the main area, the sub area may display information or the like provided from an operating system that controls the entire game console, for example. Otherwise, a mere background image or the like may be displayed.

It should be appreciated that the main area and the sub area may display images update at different frequencies. Since the main area and the sub area display different information, updating the pieces of information at respectively appropriate frequencies can sometimes reduce the amount of arithmetic processing or the like necessary for image generation.

The first and second division patterns PDIV1 and PDIV2 may be determined so that the sub areas B and B' are similar to each other in shape like the main areas. If the sub areas B and B' shown in FIGS. 2A and 2B are similar to each other, identical images rotated by 90° may be displayed in the respective sub areas.

Figure 3A:
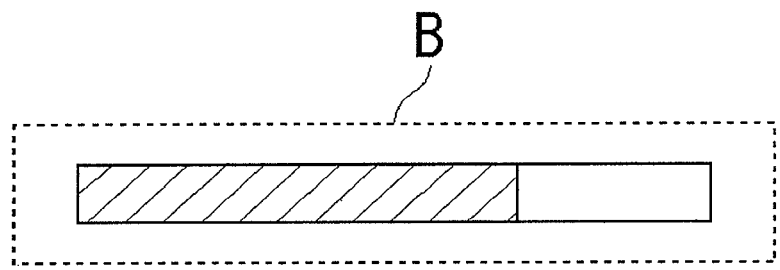
FIGS. 3A and 3B are diagrams showing examples of images to be displayed in sub areas.
Figure 3B:
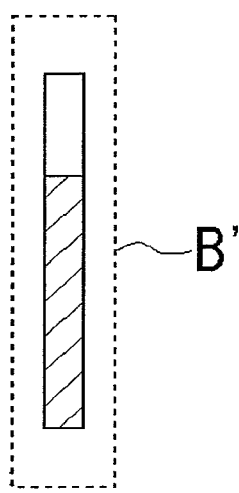

FIGS. 3A and 3B show examples of images to be displayed in the sub areas. For example, when an indicator bar for indicating a certain parameter is displayed in the sub areas, it may simply be rotated by 90° and displayed as shown in FIGS. 3A and 3B. As above, if the figure to be displayed in the sub areas is comprehensible to players even when rotated by 90°, the image output apparatus 100 has only to generate, rotate, and output an identical image for the sub areas when the sub areas are similar to each other in shape. This makes it possible to improve the development efficiency of the game.

With a display screen having an aspect ratio of 16:9 and a display screen of 4:3 (=16:12), which are the standard sizes of television sets for the game apparatus to be connected to, both the main areas and the sub areas can be made similar in shape using the following division patterns: That is, the 16:9 display screen is divided in approximately 1.26:14.74 horizontally while the 4:3 display screen is divided in approximately 9.77:2.23 vertically. On both the display screens, the main areas divided by these division patterns have a horizontal-to-vertical ratio of approximately 9:77:16, and the sub areas have a horizontal-to-vertical ratio (or vertical-to-horizontal ratio) of approximately 9:1.26. As employed herein, "approximately" implies certain allowable errors included since it might be impossible to divide into strictly similar shapes depending on the vertical and horizontal resolutions of the display units. Furthermore, some display screens having aspect ratios of 4:3 and 16:9 may not have perfect integer ratios.

When the sub areas B and B' are not similar to each other in shape, they may be used in the following manner.

For example, indicator bars such as those shown in FIGS. 3A and 3B are sufficiently comprehensible to players even when they are vertically extended, horizontally compressed, or otherwise changed in horizontal-to-vertical ratio. In such cases, an image to be displayed can be rotated by 90° and displayed as vertically/horizontally scaled up/down as appropriate even when the sub areas are not similar to each other in shape.

Figure 4A:
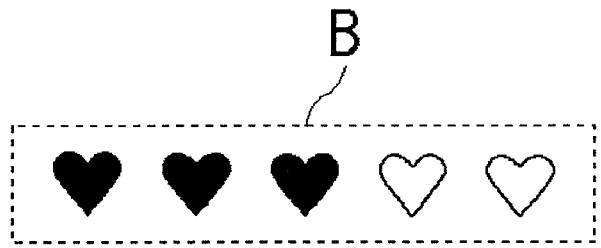
FIGS. 4A and 4B are diagrams showing examples of images to be displayed in the sub areas.
Figure 4B:
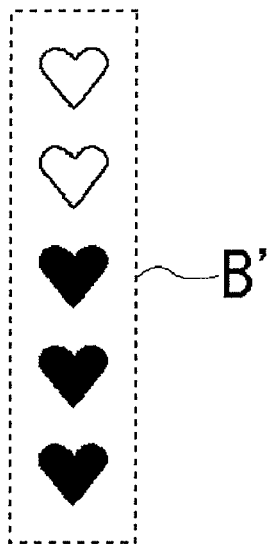

FIGS. 4A and 4B show another example of the images to be displayed in the sub areas. As shown in FIG. 4A, when a certain parameter is displayed as an array of symbols, the symbols may be displayed in a different arrangement by adjusting the spacing or the like. Such changes can be made with a slight addition or modification to the program without complicating the debugging in the development phase, and thus are effective when the sub areas are not shaped similarly to each other.

Figures 5A, 5B:
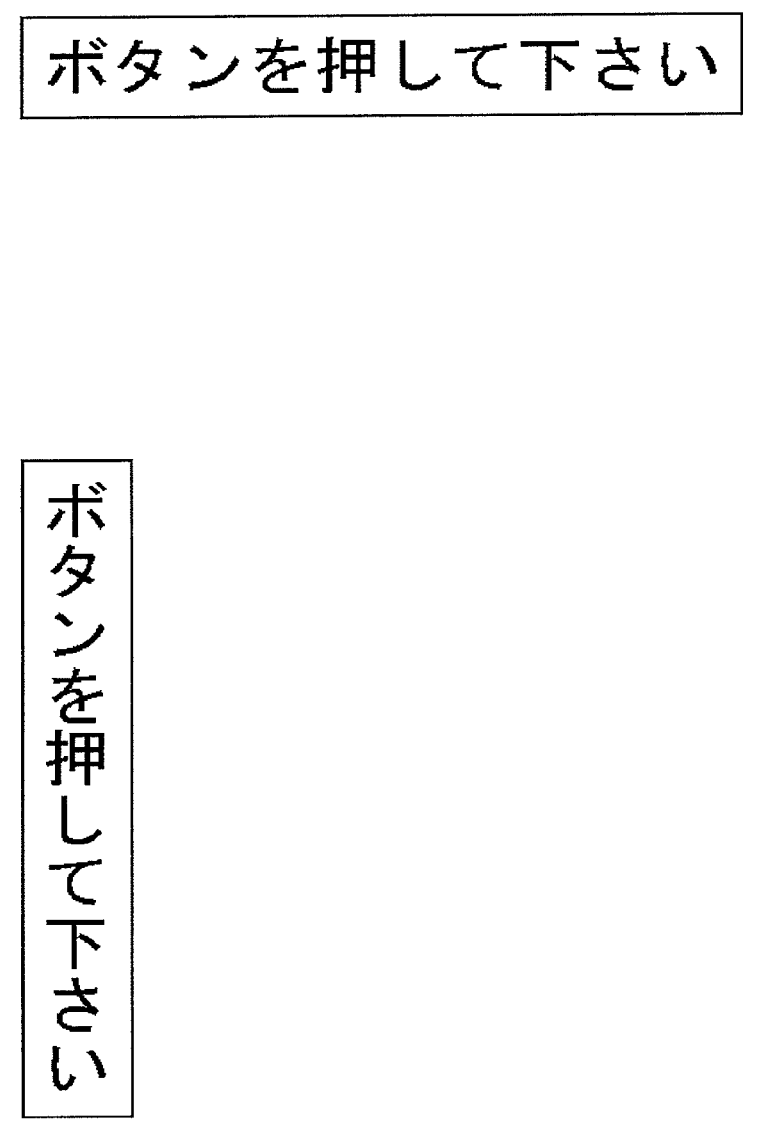

FIGS. 5A and 5B show another example of the images to be displayed in the sub areas. As shown in FIGS. 5A and 5B, if the information to be displayed in the sub areas is in Japanese, vertical writing and horizontal writing can be switched to display the text information to adapt to the shapes of the respective sub areas.

Figure 6A:
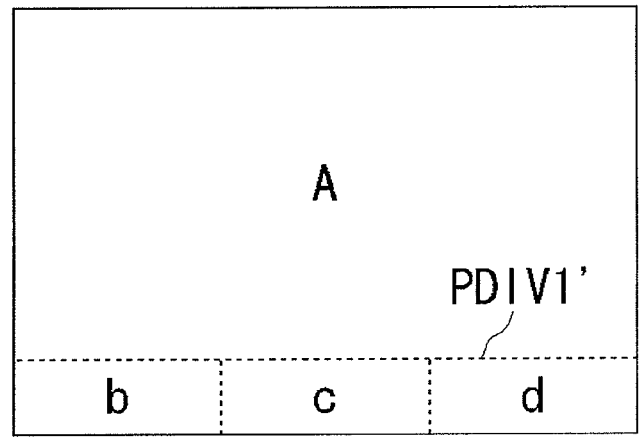
FIGS. 6A and 6B are diagrams showing division patterns with which the sub areas of FIG. 2 are further divided into three small areas.
Figure 6B:
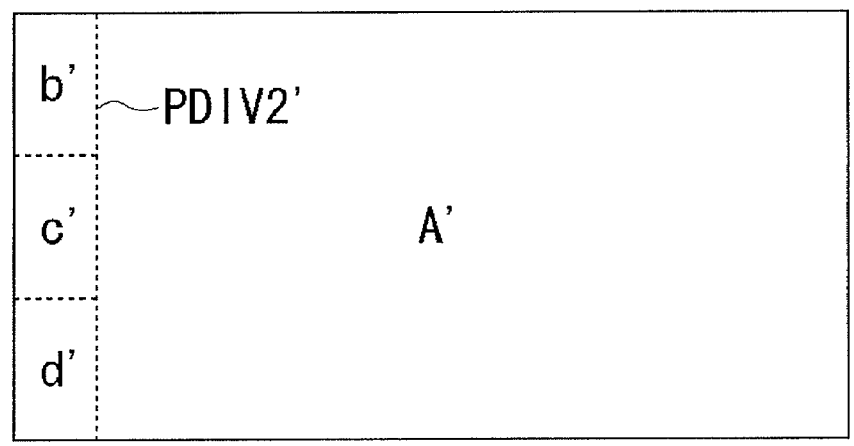

FIGS. 6A and 6B show division patterns PDIV1' and PDIV2' by which the sub areas B and B' shown in FIG. 2 are further divided into three mutually associated, small areas b, c, and d, and small areas b', c', and d', respectively. The small areas associated with each other may separately display auxiliary information such as that shown in FIGS. 3 and 4. In this way, when the sub areas are divided into the same number of small areas and the small areas are associated with each other, it is possible to provide flexible image display.

If the associated small areas are similar to each other in shape, identical images simply rotated by 90° may be displayed in the same manner as in the foregoing case where the sub areas themselves are similar to each other in shape. In this case, indicators having low directionality, such as that shown in FIG. 3 of low directionality, can be displayed.

The small areas may also be shaped similarly to one another, having the same horizontal-to-vertical ratio. In this case, images such as icons that would be hard to comprehend if rotated by 90° can be displayed since the images need not be rotated by 90°. The small areas can be given a square shape to facilitate providing similar shapes of the same horizontal-to-vertical ratio with reliability.

Such variations in the division patterns of small areas allow a more flexible layout of images regardless of whether they are directional or not.

Moreover, when the sub areas are divided into small areas, it is possible to lay out important information in positions easily viewable by players. This layout may be changed freely by the players.

As above, when the display screens are divided in different division patterns depending on the aspect ratios of the display screens, it is possible to output images and video pictures efficiently and without causing the game contents to fail.

Next, returning to FIG. 1, description will be given of the procedure and method by which the image output apparatus 100 divides a display screen with a division pattern according to the aspect ratio of the display screen, and displays images in respective areas.

The image output apparatus 100 includes a graphics processor 10, a graphics memory 12, a main processor 30, a memory 20, a display controller 40, and an aspect ratio identification unit 50.

In the diagram, the individual elements shown as functional blocks which performs various types of processing can be constituted, in terms of hardware, by a CPU, a memory, and other LSIs. In terms of software, they can be achieved by a program and the like that are loaded in a memory and have a reservation management function. It will thus be understood by those skilled in the art that these functional blocks may be achieved in various ways including hardware alone, software alone, and a combination of these, and are not limited to any one of them.

The main processor 30 is a unit which processes tasks pertaining to an operating system and individual applications. The memory 20 is a storage area to be used primarily by the main processor 30.

The graphics processor 10 is a block dedicated to image-related processing, and performs rendering processes etc. The graphics processor 10 includes an arithmetic unit 14 and a control unit 16. These blocks are connected to each other with a not-shown bus, and data signals are exchanged between the blocks.

The graphics memory 12 is a memory area dedicated to graphics-related data that is used and managed by the graphics processor 10. It includes a frame buffer for storing image frame data.

The arithmetic unit 14 performs various arithmetic processing pertaining to graphics according to commands from the main processor 30. Among the examples of processing is a series of rendering processes for performing coordinate transformation, hidden surface elimination, and shading based on three-dimensional modeling data to generate image frame data, and writing the same to the frame buffer.

The control unit 16 is a block which controls this entire graphics processor 10. It performs synchronization management on data transfer between the arithmetic unit 14 and the graphics memory 12, interrupt processing, timer management, etc. The control unit 16 also secondarily performs the division of the display screen.

The display controller 40 generates horizontal and vertical synchronizing signals. In accordance with the display timing of the display unit 200 or 300, it reads pixel data of the image frame data line by line in succession from the frame buffer stored in the graphics memory 12, and converts it into a format corresponding to the display unit 200 or 300 for output.

The aspect ratio identification unit 50 identifies the aspect ratio of the display screen of the display unit that is connected to the image output apparatus 100. The identification of the aspect ratio can be effected by either of hardware and software means. The aspect ratio may be checked by exchanging signals with the connected display unit 200 or 300. Users may input the aspect ratio according to the connected display unit. That is, the aspect ratio identification unit 50 refers to a device, means, or method for identifying the aspect ratio of the display screen to which the image output apparatus 100 outputs images.

Hereinafter, description will be given of the method by which the image output apparatus 100 having the foregoing configuration divides the display screen and outputs images to respective areas.

In a first method, each individual game application identifies the aspect ratio of the display screen and draws the entire image frame. In this case, the game application itself prepares division patterns for respective aspect ratios of the display screens. Then, it generates images for respective areas divided by a division pattern, and writes them into frame buffers corresponding to the respective areas to create image frame data.

According to this method, the division patterns of the display screen can be set application by application. This makes it possible to provide an appropriate main area and sub area with respect to each game. Furthermore, the arithmetic processing involved in rotating images to be displayed in respective areas can be achieved easily, for example, by tilting a camera by 90°. Scaling up/down can also be achieved easily by known algorithms. In this case, the image output apparatus 100, the hardware, need not have special functions.

It should be appreciated that image frame data having a horizontal-to-vertical ratio of 4:3 can be generated on the frame buffer for a widescreen television of 16:9 in aspect ratio, so that the display unit horizontally expands it for display. In this case, the application needs to change the horizontal-to-vertical ratio of the image frame data to be written to the frame buffer depending on whether it is 16:9 or 4:3. This can be achieved easily, however, by conventional techniques.

In another method, applications may generate images for respective areas regardless of the aspect ratio of the display screen so that the images are arranged by the hardware or by the operating system. In this case, the division patterns of the display screen at respective aspect ratios are set by the hardware or the operating system.

Game application developers take these division patterns into account in advance when creating games. The applications generate image data to be displayed in each area irrespective of the aspect ratio of the display screen. The pieces of data corresponding to the respective areas are temporarily stored into the memory 20 or the graphics memory 12.

The aspect ratio identification unit 50 communicates the aspect ratio of the connected display screen to the control unit 16. The control unit 16 rearranges the pieces of image frame data corresponding to the respective areas, temporarily stored in the memory 20 or the graphics memory 12, onto the graphics memory 12 as image frame data based on the division pattern corresponding to the aspect ratio communicated. Since the main areas have similar shapes even in different division patterns, an identical image will be displayed when rearranged. Sub areas and small areas may be displayed as scaled up, scaled down, or rotated 90° if necessary, depending on their respective shapes. The technologies for scaling up/down and rotating images may be practiced by various known hardware or software techniques. Description thereof will thus be omitted.

This method provides the advantage that the division patterns only need be taken into account in the phase of developing game applications, and each application, when executed by the image output apparatus 100, need not change the contents of processing depending on the aspect ratio of the display screen. In addition, even when updating individual areas at different frequencies, game applications have only to update the image data to be temporarily stored into the memory 20 or the graphics memory 12 with respect to each of the areas. This can reduce the load of the arithmetic processing. Moreover, this method facilitates utilizing any of the divided areas as an area for displaying information and the like pertaining to the operating system.

(Second Embodiment)

A second embodiment relates to an image display apparatus which receives a broadcast or receives a signal output from an image output apparatus such as a DVD player or a game console, and outputs it as an image.

Figure 7:
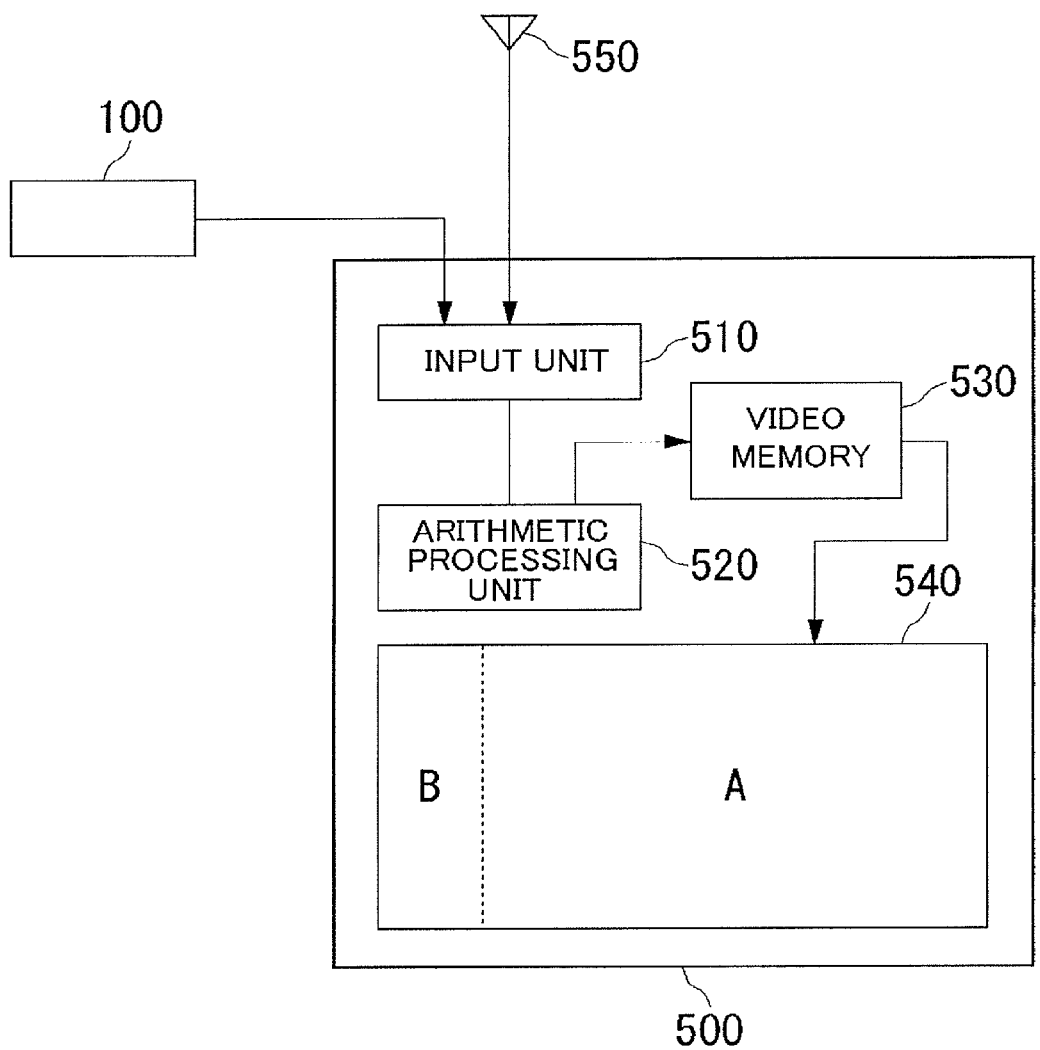
FIG. 7 is a block diagram showing the configuration of an image output apparatus according to a second embodiment of the present invention.

FIG. 7 is a block diagram showing the configuration of this image display apparatus 500. The image display apparatus 500 includes an input unit 510, an arithmetic processing unit 520, a video memory 530, and a display screen 540. As in the first embodiment, the display screen 540 is divided into several areas, and images are output to the respective areas. The division pattern to be used here is defined for each image display apparatus 500, depending on the aspect ratio of the display screen 540. For example, the division pattern of FIG. 6A is defined for one image display apparatus 500, and the division pattern of FIG. 6B is defined for another image display apparatus 500'. It is preferable that at least the main areas A and A' are defined so as to be similar in shape even on different image display apparatuses.

Broadcast data received by an antenna 550, and image data output from the connected image output apparatus 100, such as a game console or a DVD player, are input to the input unit 510. The image data input to the input unit 510 includes data Da corresponding to a main area A, and data Db, Dc, and Dd corresponding to small areas b, c, and d, and b', c', and d'. The image output apparatus 100 and the broadcast station that broadcasts the broadcast data will generate identical image data Da to Dd, and input the same to the input unit 510 irrespective of the aspect ratio of the display screen 540 of the image display apparatus 500.

The image data Da to Dd input to the input unit 510 is input to the arithmetic processing unit 520. The arithmetic processing pat 520 rearranges the image data Da to Dd in the video memory 530 so as to be displayed properly according to the division pattern.

In the case of a broadcast, the individual areas may be used such that the main area A displays basic images, and the small areas b to d display a text broadcast or the like. In the cases of quiz shows and the like, the small areas may display panelist images or answer alternatives. Moreover, when broadcasting a movie or the like, the main area A may display the video picture while the small areas b to d display subtitles or the like. In this case, the small areas of FIGS. 6A and 6B may display subtitles in horizontal writing and vertical writing, respectively.

The image display apparatus 500 according to the present embodiment may be configured so that users can switch the positions of the main area A and the small areas b to c, or change the order of the small areas b to c. In this case, the arithmetic processing unit 520 may arrange the pieces of image data on the video memory 530 in a different arrangement.

As above, in the present embodiment, the image display apparatus 500 itself is provided with the function of arranging and displaying, in individual areas, the image data that is generated on the precondition of being divided for display. As a result, the technology of dividing a display screen can be applied even to broadcasts and the like where image data is provided without identifying the aspect ratio of the display screen.

The foregoing embodiments have been given solely by way of illustration. It will be understood by those skilled in the art that various modifications may be made to combinations of the foregoing components and processes, and all such modifications are also intended to fall within the scope of the present invention.

INDUSTRIAL APPLICABILITY

According to the image output method according to the present invention, it is possible to output images and video pictures to display screens with different aspect ratios efficiently and without causing the contents to fail.

What is claimed is:

1. a display system having a processor comprising:
a first display area having a first horizontal-to-vertical ratio is configured to display, using the processor, a first main area and a first subarea on a display,
    wherein the first main area and the first subarea do not overlap, and
    wherein the first main area has a rectangular shape with a first predetermined horizontal-to-vertical ratio; and
a second display area having a second horizontal-to-vertical ratio is configured to display, using a processor, a second main area and a second subarea on the display,
    wherein the second main area and the second subarea do not overlap, and
    wherein the second main area has a rectangular shape with a second predetermined horizontal-to-vertical ratio, wherein the first horizontal-to-vertical ratio of the first display area and the second horizontal-to-vertical ratio of the second display area are different and the first predetermined horizontal-to-vertical ratio of the first main area and the second predetermined horizontal-to-vertical ratio of the second main area are the same.

2. The display system according to claim 1, wherein a size of the first main area and the second main area are different.

3. The display system according to claim 1, wherein a size of the first display area and the second display area are different.

4. The display system according to claim 1, wherein a movie is shown in the first main area or the second main area.

5. The display system according to claim 1, wherein text information, icons, indicators, r logos are displayed in the first subarea or the second subarea.

6. The display system according to claim 1, wherein the first display area and the second display area are formed on different devices.

7. The display system according to claim 1, wherein a vertical length of the first display area and a vertical length of the first main area are the same and a horizontal length of the second display area and a horizontal length of the second main area are the same.

8. The display system according to claim 1, wherein the first subarea or the second subarea includes a plurality of sub subareas and an arrangement of the plurality of sub subareas are different between a first display mode and a second display mode.

9. A non-transitory computer readable medium having stored thereon a program for carrying out a displaying method, the method comprising:
generating a first graphical display including a first main area and a first subarea,
wherein the first main area and the first subarea do not overlap, and
wherein the first main area has a rectangular shape with a first predetermined horizontal-to-vertical ratio;
generating a second graphical display including a second main area and a second subarea,
wherein the second main area and the second subarea do not overlap, and
wherein the second main area has a rectangular shape with a second predetermined horizontal-to-vertical ratio,
wherein the first horizontal-to-vertical ratio of the first display area and the second horizontal-to-vertical ratio of the second display area are different and the first predetermined horizontal-to-vertical ratio of the first main area and the second predetermined horizontal-to-vertical ratio of the second main area are same; and
outputting the first graphical display or the second graphical display on a display.

10. An image generating method comprising:
generating a first graphical display including a first main area and a first subarea,
wherein the first main area and the first subarea do not overlap, and
wherein the first main area has a rectangular shape with a first predetermined horizontal-to-vertical ratio;
generating a second graphical display including a second main area and a second subarea,
wherein the second main area and the second subarea do not overlap, and
wherein the second main area has a rectangular shape with a second predetermined horizontal-to-vertical ratio, wherein
the first horizontal-to-vertical ratio of the first display area and the second horizontal-to-vertical ratio of the second display area are different and the first predetermined horizontal-to-vertical ratio of the first main area and the second predetermined horizontal-to-vertical ratio of the second main area are same.

* * * * *